Aug. 11, 1925.  1,549,433
R. B. BENJAMIN
ELECTRICAL FIXTURE SUPPORTING DEVICE
Filed July 1, 1921
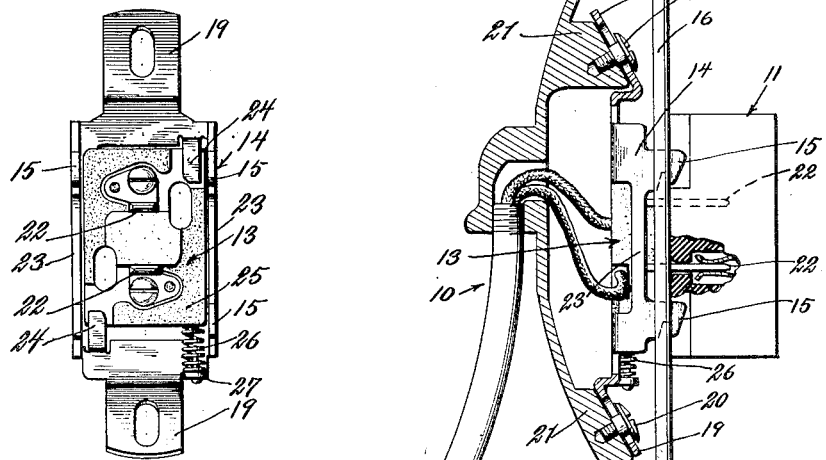
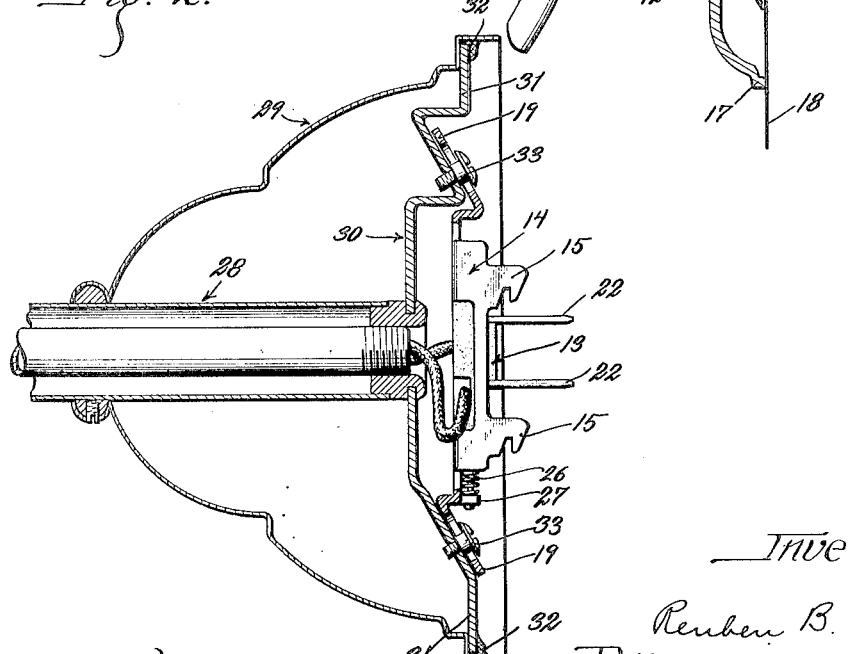
Inventor:
Reuben B. Benjamin
By
Jones, Addington, Ames & Seibold
Attys.

Patented Aug. 11, 1925.

1,549,433

UNITED STATES PATENT OFFICE.

REUBEN B. BENJAMIN, OF CHICAGO, ILLINOIS, ASSIGNOR TO BENJAMIN ELECTRIC MANUFACTURING COMPANY, OF CHICAGO, ILLINOIS, A CORPORATION OF ILLINOIS.

ELECTRICAL-FIXTURE-SUPPORTING DEVICE.

Application filed July 1, 1921. Serial No. 481,736.

*To all whom it may concern:*

Be it known that I, REUBEN B. BENJAMIN, a citizen of the United States, residing at Chicago, in the county of Cook and State of Illinois, have invented new and useful Improvements in Electrical-Fixture-Supporting Devices, of which the following is a full, clear, concise, and exact description, reference being had to the accompanying drawing, forming a part of this specification.

My invention relates to electrical fixture supporting devices, and connections therefor.

One of the objects of my invention is to provide improved means for electrically and mechanically connecting a fixture in position with respect to a receptacle.

Another object of my invention is to provide improved means whereby a fixture may be connected in position with respect to the receptacle without scraping the canopy along the surface of the adjacent wall.

A further object of my invention is to provide such a device which will be simple in construction, cheap to manufacture and durable and efficient in use.

Further objects will appear from the detailed description to follow and from the appended claims.

In the drawings in which two embodiments of my invention are shown—

Figure 1 is a vertical sectional view showing a fixture, receptacle and connecting means;

Fig. 2 is a rear elevational view showing the bracket, and plug-in device; and

Fig. 3 is a vertical sectional view showing a different form of my invention.

Referring first to Figs. 1 and 2, the construction shown therein comprises a fixture 10, a receptacle 11, a canopy 12 on which the fixture 10 is mounted, a plug-in device 13 for electrically connecting the fixture with respect to the receptacle, and a bracket 14 for mechanically supporting the canopy in position with respect to the receptacle.

The bracket 14 is connected in position with respect to the receptacle 11 by movement toward the receptacle and then downwardly with respect thereto, to engage the hook members 15 with the supporting member 16. The connection between the canopy 12 and the bracket 14 is such that after the bracket 14 is in connected position on the support 16, the canopy 12 will be moved obliquely inwardly and downwardly to bring the peripheral edge 17 of the canopy against the supporting surface 18 without causing the edge of the canopy to scrape along the supporting surface, thus preventing injury to the supporting surface.

As shown in Fig. 1, the connection between the canopy and bracket is effected by means of slotted slanting supporting members 19 formed integral with the bracket 14, through which screws 20 extend, these screws 20 being threaded into the lugs 21 formed on the canopy 12.

In order to permit the connection between the bracket 14 and the supporting member 16 to be effected by inward and downward movement, the plug-in device 13 is slidably mounted with respect to the bracket 14, so that the bracket 14 can be moved downwardly even after the contact blades 22 are inserted into the receptacle 11. This slidable connection between the plug-in device 13 and the bracket 14 is effected by means of a pair of cheek-pieces 23, formed integral with the bracket 14, and a pair of lugs 24 struck up from the material of the bracket. The insulating base 25 of the plug-in device is held between the lugs 24 and the body portion of the bracket, and is held against lateral movement by means of the cheek-pieces 23.

In order to prevent accidental disengagement of the bracket 14 from its supporting member 16, a coil compression spring 26 is provided, which acts between the plug-in device 13 and the bracket 14, one end of the spring bearing against the insulating base 25 of the plug-in device, and the other against a lug 27 formed integral with the bracket. The spring thus tends to prevent the hook members 15 of the bracket from becoming disengaged with respect to the supporting member 16.

In connecting the fixture in position, the blades 22 of the plug-in device are inserted into the corresponding openings in the receptacle 11, the fixture 10 being used as a handle if desired, and an upward pressure is then exerted on the fixture to raise the bracket 14 upwardly with respect to the plug-in device, to bring the hook members 15 into proper position to be pushed inwardly into suitable openings in the supporting member 16. After the bracket 14 has been pushed inwardly far enough to bring the hook members 15 in back of the supporting member 16, the bracket 14 is allowed to be moved downwardly by gravity and the action of the spring 26 to bring the hook members 15 into engaging relation with respect to the supporting member 16. The fixture 10 and canopy 12 are then moved obliquely inwardly and downwardly until the peripheral edge 17 of the canopy engages the supporting surface 18. This engagement of the peripheral edge 17 of the canopy with the supporting surface 18 is effected without any scraping of the edge of the canopy along the supporting surface, and consequently without any marring of this supporting surface.

In Fig. 3 is shown a construction in which the fixture 28 is not supported directly by the canopy 29, but is mounted on a supporting bracket 30, which in turn has an engagement with the supporting bracket 14, similar to the engagement between the canopy 12 and the supporting bracket 14, in the construction previously described. In the construction shown in Fig. 3, the receptacle 11, the supporting bracket 14 and the plug-in device 13 are the same as in the form previously described. In this form, however, the canopy 29, instead of serving as the main support for the fixture 28, is itself supported on the bracket 30 which supports the fixture. For this purpose, the bracket 30 is provided with extension members 31, to which the edge of the canopy may be soldered, or otherwise secured, as indicated at 32. The connection of the bracket 30 with the bracket 14 is effected by means of screws 33, which extend through the inclined slotted supporting members 19 of the bracket 14, and are screwed into the bracket 30.

The electrical and mechanical connection of the fixture 28 with the receptacle 11 in this form is effected in the same manner as is described in connection with the connection of the fixture 10 with the receptacle 11 in the form previously described.

Having thus described my invention, what I claim as new and desire to secure by Letters Patent of the United States is:

1. The combination with a fixture, and a canopy, of means for mechanically connecting said fixture with respect to a receptacle comprising a bracket, said bracket and canopy being provided with interengaging means whereby said canopy may be guided in a definite path into engagement with a supporting surface by an oblique movement inwardly and downwardly, whereby the edge of said canopy will firmly engage the supporting surface without scraping over it, said interengaging means comprising a pin and slot connection between said canopy and bracket.

2. The combination with a fixture, and a canopy, of means for mechanically connecting said fixture with respect to a receptacle comprising a bracket, said bracket and canopy being provided with interengaging means whereby said canopy may be guided in a definite path into engagement with a supporting surface by an oblique movement inwardly and downwardly, whereby the edge of said canopy will firmly engage the supporting surface without scraping over it, said interengaging means comprising a slotted member on said bracket, and a pin secured to said canopy engaging in said slot.

3. The combination with a fixture, and a canopy, of means for mechanically connecting said fixture with respect to a receptacle comprising a bracket, said bracket and canopy being provided with interengaging means whereby said canopy may be guided in a definite path into engagement with a supporting surface by an oblique movement inwardly and downwardly, whereby the edge of said canopy will firmly engage the supporting surface without scraping over it, said interengaging means comprising an inclined slotted member on said bracket, and a pin secured to said canopy engaging in said slot.

4. The combination with a fixture, and a canopy, of means for mechanically connecting said fixture with respect to a receptacle comprising a bracket, said bracket and canopy being provided with interengaging means for definitely guiding the movement of the canopy with respect to the bracket whereby said canopy is guided in a definite path into engagement with a supporting surface by an oblique movement inwardly and downwardly, whereby the edge of said canopy will firmly engage the supporting surface without scraping over it, said interengaging means being constructed to prevent the bracket and canopy from becoming disengaged.

5. The combination with a permanent support and a canopy, of means for mechanically connecting said canopy with respect to said permanent support, comprising a bracket readily detachable from said support without the use of tools, said bracket and canopy being provided with inter-engaging means for guiding said canopy in a definite path with respect to said bracket, whereby said canopy is guided in a definite path into engagement with a supporting surface by an oblique movement inwardly and downwardly whereby the edge of said canopy will firmly engage the said surface without scraping over it, said inter-engaging means having provisions for preventing the bracket and canopy from becoming disengaged, whereby the combination of the canopy and bracket may be readily detached and attached as a unit with respect to the permanent support.

In witness whereof, I have hereunto subscribed my name.

REUBEN B. BENJAMIN.